Jan. 27, 1959 T. W. KENYON ET AL 2,870,745
VARIABLE BOOST SERVO-ASSISTING SYSTEM
Filed March 24, 1954 3 Sheets-Sheet 3
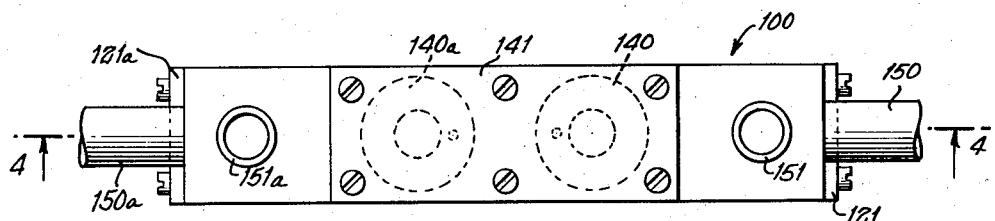
Fig. 3.
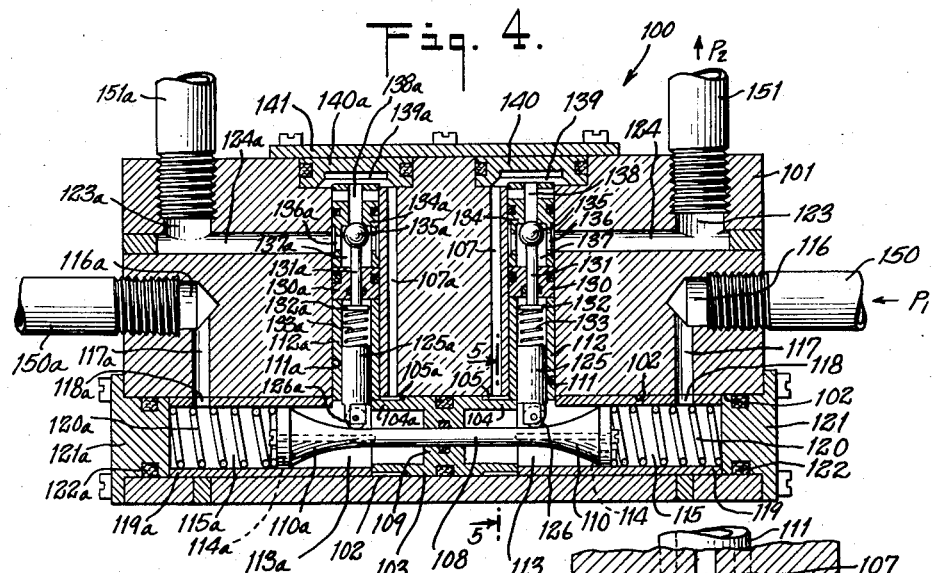
Fig. 4.
Fig. 5.
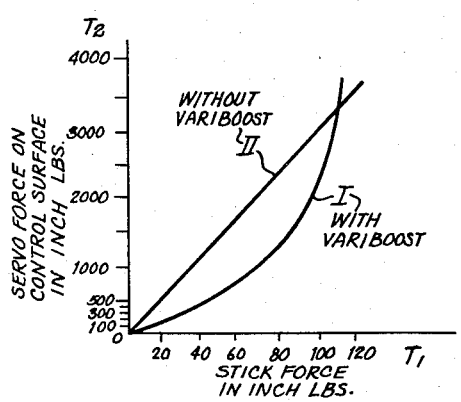
Fig. 6.
INVENTORS
THEODORE W. KENYON
BY STOKELY WEBSTER
ATTORNEY United States Patent Office 2,870,745
Patented Jan. 27, 1959

2,870,745

VARIABLE BOOST SERVO-ASSISTING SYSTEM

Theodore W. Kenyon, Old Lyme, Conn., and Stokely Webster, Huntington, N. Y., assignors, by mesne assignments, to United Aircraft Corporation, East Hartford, Conn., a corporation of Delaware Application March 24, 1954, Serial No. 418,428

11 Claims. (Cl. 121—41)

This invention relates to hydraulic power systems, and more particularly to servo-assisting systems and apparatus for controlling the flow of pressure fluid for a servomotor which is used to govern the boosting force required to position certain members, particularly the aerodynamic control surfaces of aircraft, or the rudders of ships or the like.

Modern high speed vehicles, particularly aircraft utilize servo-assisting or power amplifying systems commonly known as boosters because air loads on the control surfaces are of such magnitude, particularly as the airplane approaches maximum velocity, that unaided by such boosters the pilot would be unable to move the controls.

Power amplifying systems or boosters currently in use have a number of undesirable characteristics.

They amplify the force the pilot applies to the control stick or other control element by some fixed ratio. This fixed ratio is determined by the amplification needed for control at high air speeds and consequently is higher than that desirable when the plane is flying at slower speeds. For example, an amplification ratio of 40 to 1 may be required for aileron control at high speed. This amplification ratio being fixed, however, becomes very hard to handle at low flying speeds as when landing or at take-off.

Where a fixed amplification ratio exists, the pilot cannot feel properly the resistance of the control element to deflection. Furthermore, since all booster systems have a certain amount of inherent or static friction, there is a definite minimum force which must be applied to the control stick (a break-away force) to overcome the static friction and cause the control surface (e. g. aileron) to move at all. In a boost system with a fixed 40 to 1 amplification ratio, the minimum force which can be applied to the control surface is 40 times this break-away force. As a result, at slow speeds, particularly, over control becomes much more difficult to avoid.

Current types of boosters are made so that they can be turned off at will by the pilot, for example while flying at slow speeds. This, however, rather than dispelling the difficulties just mentioned adds additional hazards. With the booster turned on at low flying speeds, so little "feel" of the forces acting on the control surface is transmitted back to the pilot through the high amplification of the booster system, that the airplane may be very far out of trim without the pilot being aware of this situation. If the booster should be turned off, the pilot may discover that the out of trim forces are so great that he is unable to hold or operate the control surfaces manually against them. In consequence a completely involuntary maneuver of the airplane with a possible accident may result.

Boosters commonly used which have the undesirable fixed amplification ratio usually include a servomotor, a pressure source, and a transfer valve unit connected in the pressure lines between the servomotor and the pressure source. The transfer valve unit itself is mechanically coupled to the control stick of the aircraft and to the control surface so that manual movement of the control stick by the pilot will cause manual operation of the control surface. At the same time relative movement of valve parts in the transfer valve unit actuated by operational movement of the control stick and resistance to movement by the control element function to regulate the supply of hydraulic pressure from the pressure source to the servomotor for supplying amplified power from the servomotor to the control surface. A follow up movement of valve parts is effected by a feed back arrangement in the transfer valve unit whereby pressure to the servomotor in the system is cut off when a feed back pressure on transfer valve unit parts balances the oppositely directed manual force applied by the pilot to the control stick. In the aforesaid commonly used boosters, the result is a fixed amplification ratio between the manual force applied by the pilot on the control stick and the servo-assisting force supplied by the servomotor to the control surface.

Principal features and objects of this invention are to provide a hydraulic booster or servo-assisting system in which the amplification ratios between manual effort and servo effort are variable starting off at low values which are desirable for low speed flying and increasing in a continually changing manner as higher flying speeds and consequent higher manual effort is applied to a control stick or other manually operated control element.

Further objects and features of the invention are the provision of a vari-boost valve means connected in a hydraulic booster or servo-assisting system in conjunction with a transfer valve means to provide a more desirable assist response from the hydraulic booster system, namely one in which the amplification ratios are continually variable instead of being fixed, whereby undesirable characteristics of fixed amplification ratio boosters such as those hereinbefore mentioned are obviated.

Further objects and features of the invention are the provision of simple effective vari-boost valve means and transfer valve means that may be utilized together in a booster or servo-assisting system for effecting variable amplification ratios therefor in place of a fixed amplification ratio as is common in known booster systems.

Further objects and features of the invention are the provision of a vari-boost valve unit used in conjunction with a transfer valve unit whereby the follow up or feed back forces on the transfer valve unit are highly sensitive, so that under light control stick forces, for example, at slow speeds, the amplification ratio of the booster system will be low as is desirable, while under heavy control stick forces, the equivalent of high speeds, the amplification ratio of the booster system will be high, there being continually changing amplification ratios between the manually applied stick forces and the booster forces exerted on the control surface.

Further objects and features of this invention are the provision of a variable amplification ratio booster system that is relatively simple in construction and is easily installed and is fairly cheap to manufacture.

Other objects, novel features and advantages of this invention will become apparent from the following specification and accompanying drawings, wherein:

Fig. 3 is a plan view of a vari-boost valve unit embodied in the system of Fig. 1;

Fig. 4 is a longitudinal section taken along line 4—4 of Fig. 3 and viewed in the direction of the arrows;

Fig. 5 is a vertical section taken along line 5—5 of Fig. 4 and viewed in the direction of the arrows; and Fig. 6 is a graph illustrating the variable amplification ratio response characteristics of a system embodying the invention as compared with response characteristics of a similar system from which the vari-boost valve unit of the invention has been omitted.

Figure 1:
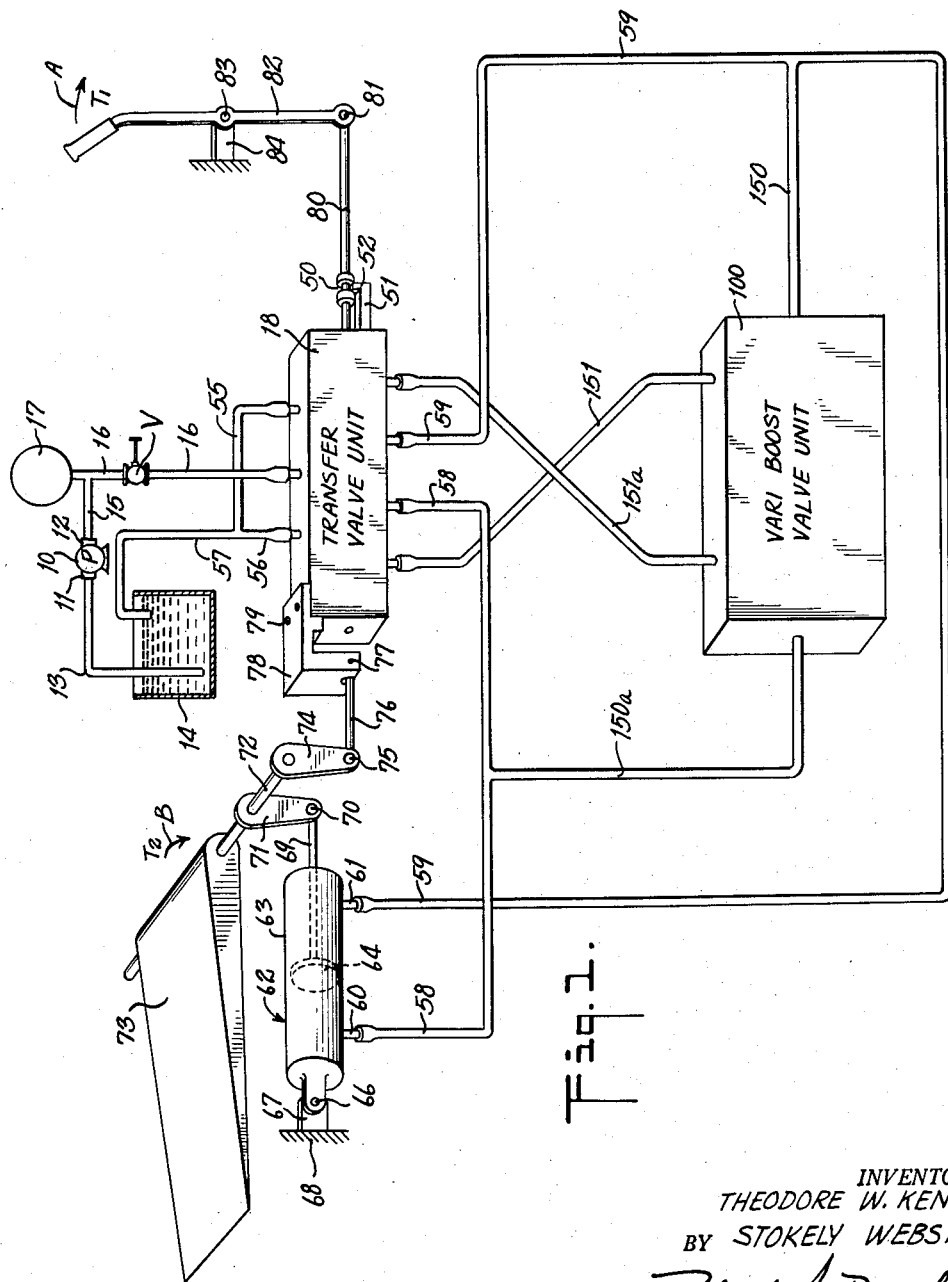
Fig. 1 is a diagrammatic illustration of a servo-assisting system embodying the invention for actuation of one of the movable control surfaces of an aircraft.

A booster system incorporating the control surface boost of this invention is shown somewhat diagrammatically in Fig. 1, the numeral 10 indicating a pump driven in any suitable way. This pump has an intake port 11 and a pressure port 12. The intake port 11 is connected by a conduit 13 to a reservoir 14 for fluid and the pressure port 12 is connected by a conduit 15 to a pressure conduit 16 which is joined to a pressure reservoir 17. An on and off valve V is interposed in the conduit 16 for controlling delivery of pressure fluid from the pump 10 and the pressure reservoir 17 to the pressure conduit 16. This pressure conduit 16 is connected to a double acting transfer valve unit 18.

Figure 2:
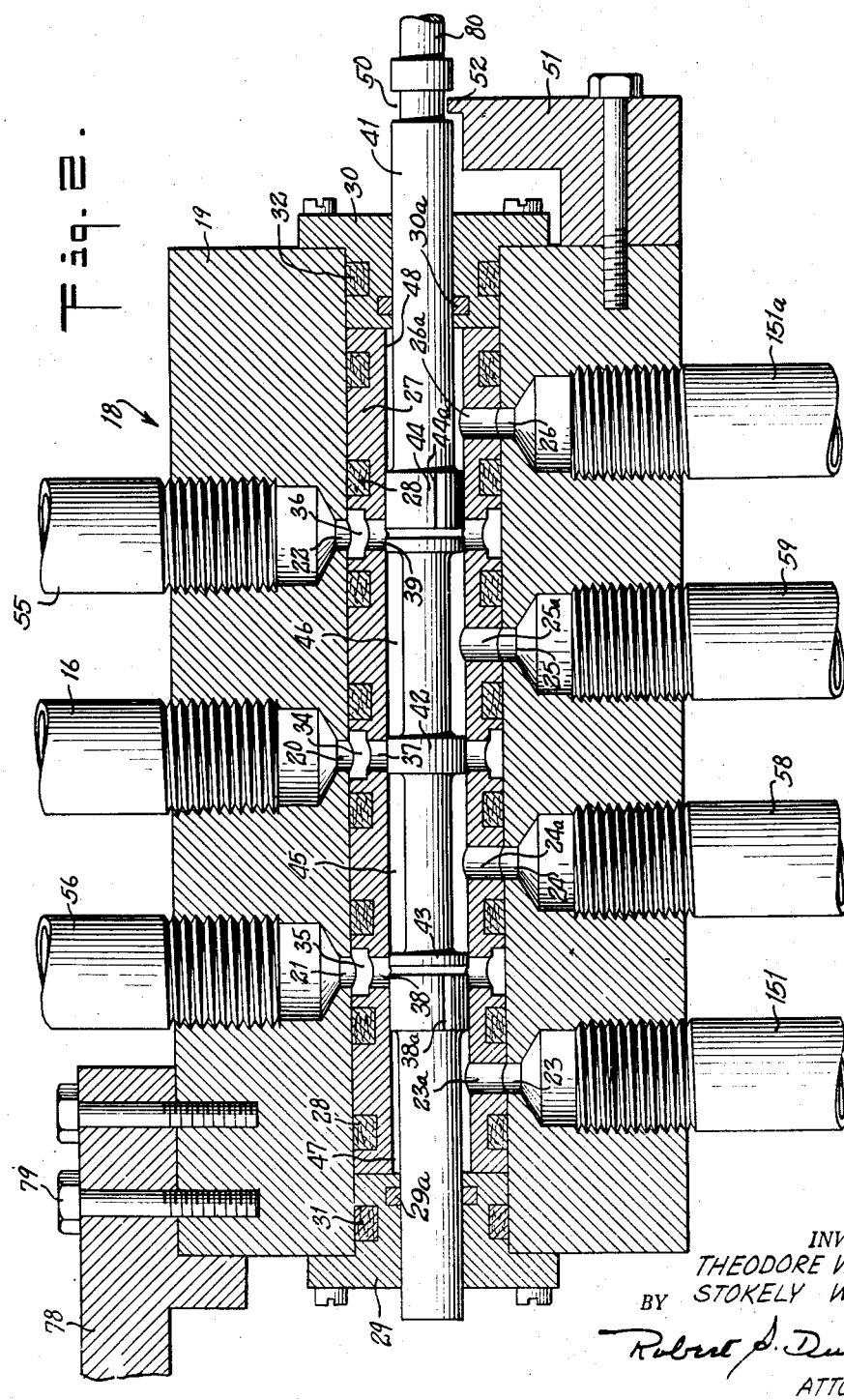
Fig. 2 is a longitudinal section of a transfer valve unit embodied in the system of Fig. 1.

This transfer valve unit 18 shown in detail in Fig. 2 includes a tubular body 19, provided with the ports 20, 21, 22, 23, 24, 25 and 26. A tubular lining 27 with peripheral sealing rings 28 is positioned within the bore of the tubular body 19 and maintained in place by removable end pieces 29, 30 which have peripheral sealing rings 31, 32, respectively.

The tubular lining 27 has annular recesses 34, 35, 36 positioned to communicate with the respective ports 20, 21 and 22. Passageways 37, 38, 39 provide communication between the respective annular recesses 34, 35 and 36 and the bore of the tubular body 27.

A piston rod 41, bearing the piston lands or valves 42, 43, 44, is guided in the end pieces 29, 30 for reciprocal movement or translation in the bore of said tubular lining 27. Packing rings 29a, 30a are provided in the end pieces 29, 30 to prevent external leakage of pressure fluid past the piston rod 41. The piston lands or valves 42, 43 and 44 are spaced from each other and divide the bore of the tubular body 27 into the separate chambers 45, 46, 47 and 48. Chambers 45 and 46 are alternately pressure and bleed chambers depending upon the direction of translation of the piston rod 41. Chambers 47 and 48 are feed back chambers for purposes presently to be described.

Piston valve or land 42 controls the admission of pressure fluid from the pressure conduit 16 via port 20, annular recess 34 and passageways 37 into either the chamber 45, or the chamber 46. Normally, as seen in Fig. 2, land 42 is centered relative to and closes off passageways 37. Its displacement to the right or left in response to corresponding movement or translation of piston rod 41 determines into which of the two chambers 45 or 46 pressure fluid will be admitted.

The piston valves or lands 43 and 44 normally close off the inner ends of passages 38 and 39. These piston valves or lands 43 and 44 move in unison with the piston valve or land 42 relative to the inner ends of passages 38 and 39 when piston rod 41 is moved to open the appropriate one of these passages to the appropriate one of the feed back chambers 45 or 46 for purposes presently to be described. Ports 24 and 25 communicate respectively with the chambers 45 and 46 through openings 24a and 25a in lining 27. Ports 23 and 26 communicate respectively with the feed back chambers 47 and 48 through openings 23a and 26a in lining 27 for purposes presently to be described.

Means for limiting reciprocal or translatory motion of the piston rod 41 relative to the sleeve 27 is provided. In the embodiment shown, the rod 41 has an annular groove 50 of selected width. A member 51 is secured to the tubular body 19. A nose 52 projecting from the member 51 extends into the groove 50. This nose 52 is narrower than the width of the groove 50 and permits limited displacement of the piston 41 relative to the sleeve 27 for the purposes of controlling the valving operations of the piston lands 42, 43 and 44. Ordinarily the stroke of piston rod 41 in either direction relative to the lining 27 is limited by the nose 52 to a few thousandths of an inch which is a sufficient lost motion arrangement to provide the necessary valving operations of said piston lands 42, 43 and 44 as will be presently described.

The ports 22 and 21 are connected by the return flow conduits 55, 56 to a common return flow conduit 57 leading to the reservoir 14 (Fig. 1).

The ports 24, 25 (of the transfer valve unit 18) that communicates respectively with the chambers 45, 46 through openings 24a and 25a, are connected by the hydraulic conduits or connections 58, 59 to the ports 60, 61 of a conventional servomotor 62 (Fig. 1). This motor 62 which is of conventional construction includes generally a pressure cylinder 63 having a double acting reciprocatory piston 64 therein. The ports 60 and 61 open into the cylinder 63 on opposite sides of the piston 64. One end of the cylinder 63 is pivotally secured at 66 to an appropriate bracket 67 secured to a fixed part 68 which may be a frame part of the aircraft or other vehicle in which the system of this invention is installed. The piston rod 69 of the piston 64 extends outwardly of the cylinder 63 and is connected pivotally at 70 to the bell crank 71. The latter is fixed to a shaft 72 which carries the control surface such as aileron 73 for which the servomotor 62 is to provide the required boost.

A second bell crank 74 fixed to the shaft 72 is pivotally secured at 75 to a link 76. Link 76 in turn is pivotally secured at 77 to a rigid connector part 78. This rigid connector part is secured to the tubular body 19 of the transfer valve unit 18 as by bolts 79.

A stem 80 is secured to the transfer valve piston rod 41. This stem is pivotally connected at 81 to the control stick or element 82 of an aircraft or other vehicle. This stick 82 is suitably pivoted at 83 to a fixed frame part 84 of the aircraft or other vehicle.

The transfer valve unit 18 is coupled to the control stick 82 through the link 80 (with slight lost motion at the nose 52 and groove 50); and valve unit 18 is coupled through part 78 and link 76 to the bell crank 74. This provides a substantially direct mechanical coupling between the control stick 82 and the control surface 73 so that a manual torque $T_1$ applied to the control stick 82 by the pilot is transmitted directly to the control surface 73. The lost motion at the nose 52 and groove 50 provides sufficient relative motion between the piston rod 41 of the transfer valve unit 18 and its lining 27 to operate the piston valves or lands 42, 43, 44 in said transfer valve unit 18 in required directions as will be described.

A double-acting vari-boost valve unit 100 is associated with the transfer valve unit 18 to provide variable amplification ratios between the torque exerted by the pilot and the torque transmitted to the control surface by the servomotor 62. This vari-boost control valve unit or means 100 is shown in detail in Figs. 3–5, inclusive.

This vari-boost valve unit 100 as shown in these figures comprises a housing or body 101 (Fig. 4) having a longitudinal bore 102. A centrally located piston guide member 103 is fitted into the bore 102. The member 103 has reduced peripheral end portions 104, 104a to provide clearances 105, 105a relative to bore 102 at its opposite ends for purposes presently to be described. A pair of vertically extending passageways 107, 107a in the housing 101 on opposite sides of its vertical center line communicate directly with the respective clearances 105, 105a. A cylindrical piston 108 is reciprocally guided in a bore provided in a transverse partition 109 of the member 103. Said partition 109 lies substantially in the vertical center line of housing 101. Cams 110, 110a are secured removably to opposite ends of the piston 108.

Vertical bores 111, 111a parallel with the respective passageways 107, 107a are provided in the housing 101 and are located respectively on opposite sides of its vertical center line. Tubular liners 112, 112a are fitted in the bores 111, 111a. The lower ends of these liners are squarely cut off and rest upon the respective end portions 104, 104a of guide member 103 so that communication exists between the clearances 105, 105a and the chambers 113, 113a on opposite sides of partition 109 for purposes presently to be described. The cams 110, 110a have small passages 114, 114a to provide communication respectively between the portions 115, 115a of chambers 113, 113a on outer sides of cams 110, 110a for purposes presently to be described.

Inlet ports 116, 116a are provided in the housing 101. Passageways 117, 117a in the housing 101 communicate through openings 118, 118a in liner sleeves 119, 119a (in bore 102), with the respective chambers 115, 115a. The liner sleeves 119, 119a are disposed in portions of the bore 102 in housing 101 in the regions of chambers 113, 115 and 113a and 115a.

Springs 120, 120a lying in the respective chambers 115, 115a each acting respectively on the outer end faces of cams 110 and 110a and the inner faces of closing off end plugs 121, 121a, act to centralize the piston 108 relative to partition 109. The end plugs 121, 121a are removably secured to the housing 101 to permit access to the contents of bore 102 thereof. Leakage preventing packing rings 122, 122a are provided for the end plugs 121, 121a.

Outlet ports 123, 123a are provided in the housing 101. These ports communicate via passageways 124, 124a respectively with the upper portions of vertical bores 111 and 111a in the housing. Cam follower supports 125, 125a fit slidably in the liners 112, 112a of vertical bores 111, 111a and project into the respective chambers 113, 113a. Cam follower rollers 126, 126a are carried by the cam follower supports 125, 125a, and engage cams 110 and 110a.

Ring like guiding members 130, 130a fit within the vertical bores 111, 111a resting on the upper ends of liners 112, 112a. Pins 131, 131a are guided vertically in these guiding members 130, 130a. Suitable packings prevent leakage past the guiding members 130, 130a or past the pins 131, 131a. The lower ends of the pins have heads 132, 132a. Loading springs 133, 133a are positioned between the heads 132, 132a and the upper ends of cam follower supports 125, 125a, thus urging the respective pins 131, 131a upwardly and the cam follower supports 125, 125a downwardly so that the cam follower rollers 126, 126a are maintained in engagement with the cams 110, 110a.

Sleeve like ball valve seat members 134, 134a containing ball valves 135, 135a are fitted into the bores 111, 111a above the members 130, 130a so that the upper ends of pins 131, 131a engage the ball valves 135, 135a and normally urge them toward their seats under action of the loading springs 133, 133a on pins 131, 131a. The seating pressure depends upon the extent of compression of the springs 133, 133a.

The housing passageways 124, 124a communicate through openings 136, 136a with the chambers 137, 137a defined by the ball valve seat members 134, 134a below their seats.

Vertical passageways 138, 138a in the valve seat members 134, 134a above the ball valves 135, 135a communicate with chambers 139, 139a defined in the closing off end plugs 140, 140a for the upper ends of the respective vertical bores 111, 111a. Suitable leakage preventing packings for these end plugs 140, 140a are provided. The end plugs 140, 140a are retained in place by a cover plate 141 secured removably to the housing 101. The vertical passageways 107, 107a in the housing 101 communicate with the chambers 139, 139a so that the same pressures existing in chamber portions 113, 113a exist in chambers 139, 139a.

Inlet portion 116 of the housing 101 is connected by hydraulic conduit 150 to the hydraulic conduit 59 (Fig. 1). The same pressure that exists in hydraulic conduit 59 always exists in conduit 150, and consequently also in portion 115 of inlet chamber 113. This pressure exists in chamber 113 also, because of passageway 114, and in chamber 139 because of passageway 107 and clearance 105. Similarly, port 116a is connected by the hydraulic conduit 150a to the hydraulic conduit 58 (Fig. 1). Therefore, the same pressure that exists in hydraulic conduit 58 always exists in portion 115a of chamber 113a because of passageway 117a, and in chamber 113a because of passageway 114a and in chamber 139a because of passageway 107a and clearance 105a.

Port 123 is connected by the hydraulic conduit 151 to the port 23 (Fig. 2) of the transfer valve unit 18 which communicates with the feed back chamber 47 thereof. Thus any feed back pressure in chamber 47 is common to the line 151, passageway 124 and chamber 137 of the vari-boost valve unit 100. Similarly, port 123a is connected by the hydraulic conduit 151a to the port 26 of the transfer valve unit 18 which communicates with the feed back chamber 48 thereof. Thus any feed back pressure in chamber 48 is common to the line 151a, passageway 124a, and chamber 137a of the vari-boost valve unit 100. Chambers 113, 113a and their portions 115, 115a may be regarded as first or inlet chambers. Chambers 139, 139a may be regarded as second or intermediate chambers and chambers 137, 137a may be regarded as third or outlet chambers of the vari-boost valve unit 100.

*Operation*

Assuming that the on and off valve V is opened to admit pressure fluid from the reservoir 17 to pressure line 16, and that the piston 41 with associated piston valves or lands 42, 43, 44 of transfer valve unit 18 are in the centered position shown in Fig. 2 and that the piston 108 of the vari-boost valve unit 100 has the centered position shown in Fig. 4, nothing occurs when valve V is opened.

If now however a torque $T_1$ is exerted by the pilot in direction of the arrow A of Fig. 1, the piston rod 41 will be moved to the left in Fig. 2 admitting a servo-operating pressure $P_1$ to the servo system from conduit 16 through port 20 and passages 37 to the chamber 46 and from there via port 25 and conduit 59 to the port 61 of the right half of servo-cylinder 63. This servo-operating pressure $P_1$ will almost invariably be something less than the full system pressure contained in conduit 16, depending upon the air load on control surface 73 acting against the force applied thereto by the servo-piston 64 in servo-cylinder 63, in addition to the other factors involved. The same leftward movement of the piston rod 41 will move piston land 43 of the transfer valve unit 18 to open position relative to the passageway 38. Thus pressure fluid in the non-working half of the servo-cylinder, in this instance the left half, communicating with port 60 of said servo-cylinder may bleed directly through conduit 58, port 24, chamber 45, passageways 38, annular recess 35, port 21 and return flow conduits 56 and 57 to the storage tank 14. The pressure in conduit 58 thus is substantially zero at such time.

In consequence the servomotor piston 64 will be moved toward the left and its piston rod 69 acting on the crank 71 will exert a torque $T_2$ on the control surface 73 in the direction of the arrow B in Fig. 1.

Since the conduit 150 is in direct connection with the conduit 59, pressure fluid at the same pressure $P_1$ of the servo system, namely, that in the conduit 59 enters the inlet chamber portion 115 of the vari-boost valve unit 100 via port 116, passageway 117 and opening 118. At the same time chamber 115a of said unit 100 is at substantially zero pressure because any fluid in it may bleed directly via opening 118a, passageway 117a, port 116a and conduit 150 to the conduit 58 which has been opened to bleed as described. In consequence the piston 108 of the vari-boost valve unit is moved leftwardly because of the pressure differential between chambers 115 and 115a and in proportion to the pressure differential in the said two chambers. The cam 110 also moves leftwardly. Cam roller 126 and with it the cam follower support 125 are thus moved upwardly compressing the loading spring 133 and increasing the upward seating force of the pin 131 on the ball valve 135. However, because of the passageway 114 in the cam 110 pressure fluid from chamber 115 at the same pressure $P_1$ as that in it passes via passageway 114 and chamber 113 and via clearance 105 and passageway 107 into chamber 139, and, via passageway 138 exerts a downward force $P_1$ on the ball valve 135 tending to unseat it. Pressure $P_2$ established in the chamber 137 below the ball valve 132 builds up until the established up pressure of $P_2$ on the ball valve 135 in the chamber 137 plus the up pressure on the ball valve 135 exerted by the pin 131 through the action of cam 110 is equal to the down pressure on the ball valve 135 exerted by the pressure $P_1$ in chamber 139. At this point the ball valve 135 returns to its seat and pressure $P_2$ in chamber 137 can build no higher.

The established pressure $P_2$ of fluid in the chamber 137 exists in the passageway 124, because of its communication through openings 136 with said chamber 137. This same pressure $P_2$ exists in the feed back conduit 151 which is connected to port 123 that communicates with passageway 124. This established pressure $P_2$ of fluid in the feed back conduit 151 is transmitted via feed back conduit 151 to port 23 of the transfer valve unit 18 and enters the feed back chamber 47 thereof. This established pressure $P_2$ appearing in said feed back chamber 47, applies a feed back force on the piston land or valve 43 tending to move the latter and consequently piston rod 41 to the right with respect to the tubular body 19 of the transfer valve. When the force resulting from pressure $P_2$ on the land 43 is in balance with the opposite force applied by the pilot on the control stick 82 through link 80 and piston rod 41, the piston valve or land 42 will again be centered relative to port 20 and thus cutting off any increase of pressure $P_1$ from the pressure feed line 16 to the operating side of servo-cylinder 63. It will be understood that the feedback pressure $P_2$ from the vari-boost unit builds up in chamber 47 until it momentarily overcomes the force exerted on rod 41 by the pilot. At this time, the valve spool 19 moves to the left as viewed in Figure 2 with respect to rod 41 to close the valves. When the valves close, the force exerted by the pilot and the feedback pressure $P_2$ are equal. At this time the supply pressure $P_1$ to feed line 58 or 59 is cut off.

The established feed back pressure $P_2$ is always less than the servo system pressure $P_1$ by an amount which is a function of the amount that the spring 133 is compressed by the described leftward translation of the cam 110 caused by the presence of servo system pressure $P_1$ in chamber 115 of the transfer valve unit 100. The amount of compression of spring 133 is a function of the amount of translation and of the shape of cam 110. In the embodiment shown, the greater the pressure $P_1$ to the servomotor 62 through conduit 59, the greater will be the differential between the pressure $P_1$ tapped from conduit 59 via conduit 150 and entering chamber 115 as described, and the established feed back pressure $P_2$ which via conduit 151 enters the feed back chamber 47 of the transfer valve unit 18 to produce the feed back force required to recenter the piston 41 and its piston valves or lands 42, 43, 44.

With low stick forces applied by the pilot to the control stick, i. e., low values of $T_1$ the pressure $P_2$ will, at forces near zero, be approximately of the same value as $P_1$; but the pressure $P_2$ will rise, will be at a much lower rate than the rate of rise in servo-assisting action caused by pressure $P_1$. As stick forces $T_1$ increase the servo-assisting action of servo pressure force $P_1$ rises. The feed back pressures $P_2$ rise, too, but the rate of rise is slow and reaches an ultimate limit as many times lower than the peak servo pressure $P_1$ action as may be desired, depending upon the shape of cam 110 and consequent amount of compression of spring 133.

The effect of establishing feed back pressures $P_2$ of decreased value is relation to the servo-motor pressure $P_1$ is to increase the effective power amplification of the booster system, and the result is a constantly changing ratio of amplification between the stick force $T_1$ and the servo-assisted force or torque $T_2$ on the control surface 73. This is seen graphically in Fig. 6 wherein the abscissae represent manual control stick force torque $T_1$ in inch lbs. and the ordinates the servo-assisted force $T_2$ on the control surface 73 also in inch lbs. Referring to Fig. 6, the curve I shows the relationship between $T_1$ and $T_2$ when the vari-boost valve unit 100 is connected in the system with the transfer valve unit 18 as herein described. From this curve I it will be seen that the amplification ratio $T_2/T_1$ continually changes. With low forces $T_1$ applied to the control stick 82, a low amplification ratio between $T_2$ and $T_1$ exists being of the order of approximately 3 or 4 to 1. As the force $T_1$ is increased the forces or torques $T_2$ working to operate the control surface 73 rise at rate which is greater than in direct proportion to the pilot's torque effort $T_1$. As the two torques $T_1$, $T_2$ increase, so does the amplification ratio $T_2/T_1$. By the time therefore that the pilot is exerting a torque $T_1$ on the control stick 82 required of him to achieve maximum control surface torque $T_2$ he will be producing the required high torque $T_2$ through the transfer valve unit 18 and vari-boost valve unit 100 even though only a low amplification ratio between $T_2$ and $T_1$ exists at low flying speeds. However, at low speeds he does not require a large amplification ratio.

The curve II of Fig. 6 represents or shows the effect of omitting the vari-boost valve unit 100. In such instance conduit 151 would be connected directly to the conduit 59 and conduit 151a would be connected directly to the conduit 58. Thus feed back pressures would always be equal to servomotor pressures. In consequence the curve II of Fig. 6 is a straight line and the amplification ratio $T_2/T_1$ is a fixed one and is not variable and may, for example, be 40 to 1. Such a fixed amplification ratio of 40 to 1 may be satisfactory for operating the control surface 73 while flying at high speeds, but such a high amplification ratio at low flying speeds will make it hard for the pilot to control the control surface such as when landing or at take-off.

The use, however, of the vari-boost valve unit 100 in conjunction with the transfer valve 18 as described herein provides a curvilinear amplification ratio response characteristic as indicated by the curve I of Fig. 6, with low amplification ratio at low speeds and low control stick torques, and continually changing amplification ratios which increase as required for proper manipulation of the control surface 73 at all high flight speeds.

The entire operation of the system has been described with reference to operation of control stick 82 in a clockwise direction as seen in Fig. 1. Since the transfer valve unit 18 and the vari-boost unit 100 are each double-acting, similar variable follow up action and variable torque ratios will occur on operation of the control stick 82 in reverse direction. In such instance feed back pressures $P_2$ would be established in the chamber 137a at the left of the center line of the vari-boost valve unit 100. The cam 110a and spring 133a would be the controlling elements in establishing the feed back pressure $P_2$. These feed back pressures $P_2$ would be delivered by conduit 151a to the feed back chamber 48 of the transfer valve unit. Chamber 45 of the transfer valve unit would be the one opened to pressure from conduit 16 by a rightward shift of the piston rod 41 and chamber 46 would be the one opened to the return flow conduits 55 and 57. Thus the left half of the servomotor 62 would be the operative one. Similarly the parts in the left half of the vari-boost valve unit 100 to the left of its vertical center line and numbered identically with corresponding parts in the right half of the unit but bearing subscripts a would be the operative parts. This it is believed will be well understood by those skilled in the art making it unnecessary to repeat a detailed description of action of the vari-boost valve unit action upon a reverse operation of the control stick 82 from that which has been described in detail above.

The shape of curve I of Fig. 6 can be controlled and made to take any required form by variation in the shape of the respective cams 110, 110a of the vari-boost valve unit 100.

It is to be noted that although the feed back pressures $P_2$ that are built up, as described, in the feed back chambers 47 and 48 of the transfer valve unit 18, might seem to be trapped by the action of the ball valves 135 and 135a so that pre-existing feed back pressures would upset the normal operation of the system; such upset does not take place because of the normal leakage of fluid past the ball valves 135 and 135a as well as past the piston valves or lands 43 and 44. Therefore, even though the ball valves 135 and 135a will act as check valves when either chamber 139 or 139a is effectively connected to the return or zero pressure side of the system along with its corresponding chamber 113 or 113a, still the normal leakage will cause the feed back pressure thus trapped to be dissipated before the next application of torque in the same direction. Should the normal leakage be too slow so that erratic control action by the system is caused, appropriate bleed passages such as passages 38a and 44a shown in lands 43 and 44 in Figure 2 may be provided to insure sufficiently rapid bleeding off of the feed back pressures following the cessation of the usefulness of said feed back pressures. It is to be noted that the feedback pressure $P_2$ builds up extremely rapidly with the result that the normal leakage of the system does not appreciably affect operation of the system during this pressure build-up. Leakage in the system is sufficiently rapid, however, to permit successive operations in the same direction by the pilot in a relatively short period of time.

It will be seen from the foregoing that the ball valve 135 operated as described hereinabove with relationship to the chambers 139 and 137, by the cam 110, cam follower 125, spring 133 and pin 131 constitutes a pressure reduction means in the vari-boost valve unit 100 for reducing servo-operating pressure to establish variable feed back pressures which are always lower than servo-operating pressure whereby the amplification ratios between servo effort provided by the servo-operating pressure in the described servo-assisting system and the manual effort exerted on the control element, vary continually. This is likewise true as regards the ball valve 135a and its associated parts.

While a specific embodiment of the invention has been described, variations in structural detail are possible and are contemplated. There is no intention, therefore, of limitation to the exact details shown and described.

We claim:

1. A variable boost fluid motor-assisting system including in combination a source of fluid under pressure, a fluid motor to be supplied with fluid from said source, a transfer valve connected between said source and said motor, means for actuating said transfer valve to connect said source to said motor to supply fluid under a system pressure, variable pressure reducing means adapted to receive fluid under said system pressure and adapted to be operated to provide fluid under a feedback pressure which is less than said system pressure, said transfer valve including means for receiving feedback fluid for operating against said transfer valve actuating means and means responsive to fluid under said system pressure supplied from said source by said transfer valve for operating said variable pressure reducing means.

2. A variable boost fluid motor-assisting system as in claim 1 in which said transfer valve and said variable pressure reducing means are double-acting.

3. In a servo assisting system including a pressure source, transfer valve means operable in response to manual effort exerted on a control element for supplying servo-operating pressure from the pressure source to the system, vari-boost valve means hydraulically connected to receive servo-operating pressure from the transfer valve means to cause the same to establish feed back pressures which effect feed back operation of the transfer valve means to closing off condition, said vari-boost valve means including cam and spring actuated pressure reduction means for reducing said servo-operating pressure whereby the established feed back pressures are always different from the servo-operating pressure, and whereby the amplification ratios between servo-effort provided by the servo-operating pressure in said system and the manual effort exerted on the control element vary continually.

4. In a servo-assisting system including a pressure source, transfer valve means operable in response to manual effort exerted on a control element for supplying servo-operating pressure from the pressure source to the system, vari-boost valve means hydraulically connected to receive servo-operating pressure from the transfer valve means to cause the same to establish variable feed back pressures which effect feed back operation of the transfer valve means to closing off condition, said vari-boost valve means including pressure reduction means for reducing said servo-operating pressure whereby the established feed back pressures are always lower than the servo-operating pressure whereby the amplification ratios between servo effort provided by the servo-operating pressure in said system and the manual effort exerted on the control element vary continually and said pressure reduction means including cam and spring operated valves.

5. In a servo-assisting system including a pressure source, transfer valve means operable in response to manual effort exerted on a control element for supplying servo-operating pressure from the pressure source to the system, vari-boost valve means hydraulically connected to receive servo-operating pressure from the transfer valve means to cause the vari-boost valve means to establish feed back pressures which effect feed back operation of the transfer valve means to closing off condition, said vari-boost valve means including pressure reduction means for reducing said servo-operating pressure whereby the established feed back pressures are always lower than the servo-operating pressure whereby the amplification ratios between servo effort provided by the servo-operating pressure in said system and the manual effort exerted on the control element vary continually, and said pressure reduction means including ball valves, springs for providing seating pressure to said ball valves and cam means displaceable by servo-operating pressure for varying the compression of the springs and thereby varying the seating pressure on the ball valves by the springs.

6. In a servo-assisting system including a pressure source, a servomotor for exerting amplifying effort to a control surface, a transfer valve unit having valving parts operable in response to manual effort of a pilot on a control element for controlling the supply of servo-operating pressure to said servomotor from said source, said transfer valve unit including feed back chambers to which feed back pressures tending to restore the transfer valve unit to a closed condition are to be supplied, a vari-boost valve unit interconnected hydraulically with said transfer valve unit, and spring and cam-operated means pressure reduction means included in said vari-boost valve unit and operated by the pressure of the source delivered by the transfer valve unit for operating the servomotor for establishing variable feed back pressures through the vari-boost valve unit to the feed back chambers of the transfer valve unit, whereby the established feed back pressures are lower than the pressure from said source delivered through the transfer valve unit to operate the servomotor when manual effort is applied by the pilot to the control element, said established feed back pressures increasing to a desired limit as manual effort on said control element is increased at a slower rate than the increased servo action of pressure from the source to the servomotor caused by the same increase in manual effort, whereby the amplification ratios between manual pilot effort and the amplified effort exerted by the servomotor are continually variable.

7. In a servo-assisting system for aircraft or the like having a hydraulic power cylinder for operating a control surface of the aircraft, a transfer valve unit for controlling the operation of the cylinder comprising a body hydraulically interconnected to the power cylinder and having supply and return fluid connections thereto, said transfer valve unit having pressure-operated feed back means for automatic restoration to a closed condition, a vari-boost valve unit comprising a body hydraulically interconnected in the said supply connections to the power cylinder, feed back fluid connections between the vari-boost valve unit and the feed back means of the transfer valve unit, and cam and spring controlled valves in said vari-boost valve unit for maintaining feed back pressures in said feed back fluid connections that are variable with respect to the pressure in the supply connections to the power cylinder, and reach a desired limited value, whereby the amplification ratios of the amplifying effort of the hydraulic power cylinder relative to manual effort applied in operating the transfer valve unit are continually variable.

8. In a servo-assisting system for supplying amplified operating force with varying ratio of amplification to the control surface of an aircraft or the like, a servomotor, a hydraulic pressure supply source, transfer valve means, hydraulic connections between said supply source, said servomotor and said transfer valve means, and a vari-boost valve means, said last-named means comprising a body having a first chamber, a second chamber, and a third chamber, said body having passageways connecting said first and second chambers, said body having a passageway connecting said second and third chambers, a ball valve in the last-named passageway, a seat for said ball valve, a displaceable cam in the first chamber, a cam follower, a spring between said cam follower and said ball valve acting upon said ball valve to bias it towards its seat with variable pressure depending upon the displacement of said cam and the consequent amount of compression of said spring, hydraulic connection between said first-named chamber of said vari-boost valve means and a pressure supply chamber of said transfer valve means whereby the same pressure appears in said first-named chamber as exists in said pressure supply chamber of said transfer valve means, and hydraulic connection between said third chamber of said vari-boost valve unit and a feed back chamber of said transfer valve means, said ball valve under action of said spring and cam, in opposition to pressure against said ball valve delivered to it from the second chamber acting to maintain variable differentials of pressure between said second and third chambers which are functions of the extent of displacement of said cam and the amount of compression of said spring effected thereby.

9. In a servo-assisting system including a pressure source, vari-boost valve means for providing continually variable amplification ratio between manually exerted forces and servo-amplified forces in said system comprising a body having an inlet chamber and an outlet chamber, a cam member displaceable in said inlet chamber, a cam follower engaging said cam member and displaceable in response to movement of said cam member, a spring adapted to be compressed by displacement of said cam follower, a ball valve seat member having a seat, a ball valve, pin means between the spring and ball valve for urging said ball valve towards its seat with variable pressure which is a function of the extent of displacement of said cam and the consequent compression of said spring, said body having an intermediate chamber between its inlet and outlet chambers, means providing communication between said inlet chamber and said intermediate chamber to maintain the latter at substantially the same pressure as said inlet chamber, means for supplying the latter pressure to said inlet chamber from said source to maintain an unseating pressure on said ball valve which is always equal substantially to the pressure from said source appearing in said inlet chamber, resulting feed back pressures appearing in the outlet chamber thereby being variable and being the difference between the said unseating pressure in said intermediate chamber and the opposing seating pressure on said ball valve effected by displacement of said cam and consequent compression of said spring, and hydraulic connection connecting said outlet chamber in said system to deliver the feed back pressures from the outlet chamber into said system.

10. In a servo-assisting system including a pressure source, vari-boost valve means for providing continually variable amplification ratios between manually exerted forces and servo amplified forces comprising a body having a longitudinal bore, a partition separating said bore into a pair of alined pressure inlet chambers, double-acting transfer valve means hydraulically connected to said source and said vari-boost valve means for providing pressure from the source to one of said inlet chambers at a time, said transfer valve means having a pair of feed back chambers, a piston movable reciprocally in said two inlet chambers, like cams on opposite ends of said piston, a cam follower for each cam, a spring associated with each cam follower, said body having a pair of outlet chambers and a pair of intermediate chambers, means providing direct communication between each of said pair of intermediate chambers and a different one of said alined inlet chambers, a pair of like ball valve seat members each having a seat providing communication between a different one of said outlet chambers and a different one of said intermediate chambers, ball valves, one for each of said seats, pins one engaging each of said ball valves and each urged against one of the latter by one of said springs to provide variable seating pressures respectively for each ball valve against that one of the valve seats associated with it, that are functions respectively of the extent of displacement of a particular one of the cams displaced and the extent of the compression of a particular one of the springs compressed whereby variable pressure differentials will appear as between that intermediate chamber that communicates with that one of the inlet chambers in which pressure from said source appears and the outlet chamber of said body in communication through the ball valve seat with the last-named intermediate chamber, said pressure differential providing variable feed back pressures in the last-named outlet chamber whose value is the difference between the pressure in the intermediate chamber and the opposing seating pressure on the ball valve effected by the displaced one of the cams and consequent amount of compression of the compressed one of said springs, and hydraulic connections connecting the outlet chambers and the feed back chambers in said transfer valve means to deliver the variable feed back pressures appearing in the said outlet chambers thereto.

11. In a servo-assisting system for supplying amplified operating force with varying ratio of amplification to the control surface of an aircraft or the like, a double-acting servomotor, a supply source for hydraulic pressure, a pilot-operated control element, a double-acting transfer valve unit having pressure and return flow chambers and feed back chambers, parts in said transfer valve mechanically coupled to the control element and to the control surface and movable relative to each other, and valves operable on relative movement of said parts for controlling flow of fluid to and from the supply source through appropriate of the pressure and return flow chambers of said unit and appropriately to operate the servomotor in servo-assisting direction, hydraulic lines interconnecting the pressure and return flow chambers of the transfer valve unit and the supply source, hydraulic lines interconnecting the pressure and return flow chambers of the transfer valve unit and the servomotor, a vari-boost valve unit interconnected with said last-named hydraulic lines and having chambers respectively maintained at substantially the pressures in said last-named hydraulic lines, said transfer valve unit also having other chambers, hydraulic lines interconnecting said other chambers and the feed back chambers of said transfer valve unit, means providing intercommunication internally of said vari-boost valve unit between selected of its said other chambers and its first-named chambers and cam and spring operated valve means in the intercommunication means for maintaining pressure differentials between any particular one of the selected of said other chambers and that one of the first-named chambers of the vari-boost valve unit intercommunicating with it and with one of the feed back chambers of the transfer valve unit and to establish variable feed back pressures, said pressure differentials having a limited maximum value whereby the established feed back pressures delivered via the vari-boost valve unit to the appropriate feed back chamber of the transfer unit are variable and always lower than the pressure delivered from the source to the servomotor with increasing manual effort on the control element by the pilot.

References Cited in the file of this patent

UNITED STATES PATENTS

| | | |
|---|---|---|
| 2,401,680 | Eaton | June 4, 1946 |
| 2,596,242 | Hill | May 13, 1952 |